(12) United States Patent
Kubicki et al.

(10) Patent No.: US 8,807,290 B2
(45) Date of Patent: Aug. 19, 2014

(54) BRAKE ASSEMBLY HAVING WEAR AND FAILURE INDICATOR

(71) Applicant: Caterpillar Inc., Peoria, IL (US)

(72) Inventors: David A. Kubicki, Decatur, IL (US); Wesley C. Worsham, Decatur, IL (US); Bradley G. Kaufman, Oreana, IL (US)

(73) Assignee: Caterpillar Inc., Peoria, IL (US)

( * ) Notice: Subject to any disclaimer, the term of this patent is extended or adjusted under 35 U.S.C. 154(b) by 54 days.

(21) Appl. No.: 13/646,351

(22) Filed: Oct. 5, 2012

(65) Prior Publication Data

US 2014/0097047 A1 Apr. 10, 2014

(51) Int. Cl.
*F16D 66/02* (2006.01)

(52) U.S. Cl.
USPC .................................................. 188/1.11 W

(58) Field of Classification Search
CPC ...... F16D 66/02; F16D 66/022; F16D 66/026
USPC .................. 188/1.11 W; 192/30 W; 116/208; 340/454
See application file for complete search history.

(56) References Cited

U.S. PATENT DOCUMENTS

| | | | |
|---|---|---|---|
| 3,533,491 A | 10/1970 | Svenson | |
| 4,084,671 A | 4/1978 | Ternehall | |
| 4,186,822 A | 2/1980 | Khuntia et al. | |
| 4,356,897 A | 11/1982 | Urban | |
| 4,658,936 A | 4/1987 | Moseley | |
| 5,035,303 A | 7/1991 | Sullivan | |
| 5,186,284 A | 2/1993 | Lamela et al. | |
| 5,228,541 A | 7/1993 | Plude | |
| 5,697,472 A | 12/1997 | Walker et al. | |
| 6,047,793 A | 4/2000 | Hasegawa et al. | |
| 6,076,639 A | 6/2000 | Dahlén et al. | |
| 6,702,068 B1 | 3/2004 | Riebe | |

FOREIGN PATENT DOCUMENTS

JP 2003-74609 3/2003

*Primary Examiner* — Christopher Schwartz
(74) *Attorney, Agent, or Firm* — Finnegan, Henderson, Farabow, Garrett & Dunner LLP

(57) ABSTRACT

A brake assembly for a mobile machine is disclosed. The brake assembly may have a brake housing, an output member rotatably disposed within the brake housing, and a disc stack disposed within a cavity of the brake housing. The disc stack may include a plurality of friction discs coupled to the output member and a plurality of separator plates interleaved with the plurality of friction discs and coupled to the brake housing. The brake assembly may also have a piston disposed within the cavity and configured to compress the disc stack, and an indicator received within a bore of the brake housing against the piston. The indicator may include a first feature configured to provide at least one of visual and tactile indication of wear of the disc stack, and a second feature configured to provide at least one of a visual and tactile indication of failure of the disc stack.

24 Claims, 4 Drawing Sheets

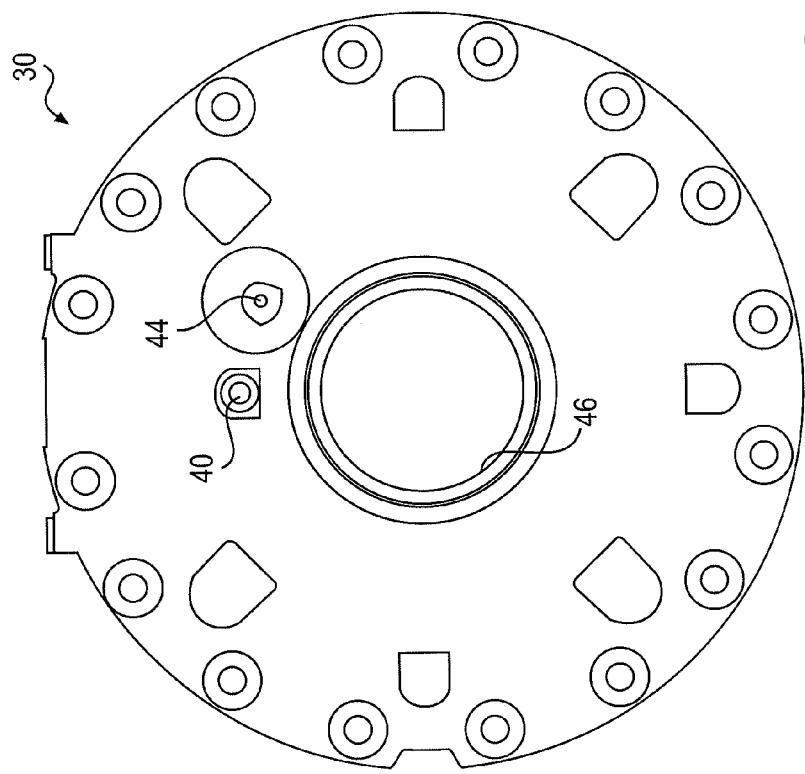
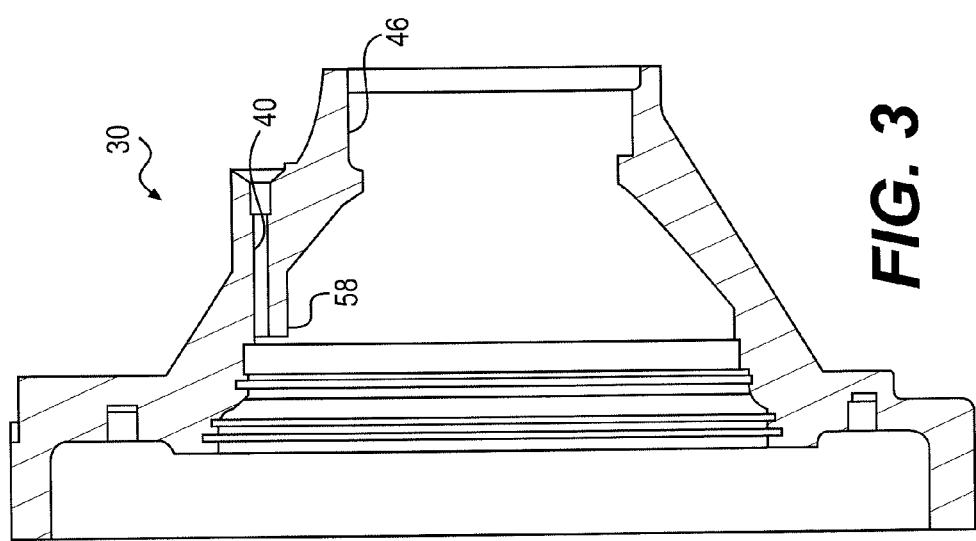

BRAKE ASSEMBLY HAVING WEAR AND FAILURE INDICATOR

TECHNICAL FIELD

The present disclosure is directed to a brake assembly and, more particularly, to a brake assembly having a wear and failure indicator.

BACKGROUND

Machines, including wheel loaders, on- and off-highway haul trucks, vocational trucks, motor graders, and other types of heavy equipment generally include a brake assembly operatively connected to each traction device of the machine. Typical brake assemblies include a plurality of friction discs connected to rotate with an axle of the machine, a plurality of separator plates disposed between adjacent friction discs and rotationally constrained at their periphery by a brake housing, and a piston configured to push the friction discs and separator plates together, thereby generating frictional torque between the plates and discs that retards rotation of the axle. Brake assemblies that are cooled via fluid are known as wet brake assemblies.

Over time, the friction discs and/or separator plates wear and need to be replaced in order for the brake assembly to continue to provide a desired level of braking. Replacing the plates before they are completely worn increases the operating cost of the machine. Delaying replacement of the plates can result in reduced braking and/or damage to the brake assembly. Unfortunately, it may not always be known when the plates and/or discs are fully worn and should be replaced. This may be especially true for wet brake assemblies, as the plates and discs are enclosed and cannot be readily observed without disassembly.

The friction discs and/or separator plates can also be damaged before they are completely worn. In particular, if the brake assemblies are actuated excessively and/or without appropriate cooling, the plates can overheat. When the plates and discs overheat, they can warp from the elevated temperatures, causing the brake assemblies to function poorly or not all. Similar to worn plates or discs, damaged plates and discs can be difficult to detect.

One way to determine when the friction discs and/or separator plates of a wet brake assembly are worn is disclosed in U.S. Pat. No. 4,186,882 issued to Khuntia et al. on Feb. 5, 1980 ("the '882 patent"). Specifically, the '882 patent discloses an oil cooled disc brake having a disc pack enclosed within a housing. Wear of the disc pack can be checked by a service technician without requiring disassembly of the brake, by insertion of a pin into an existing boss of the housing. When the service brake piston is actuated to squeeze a new disc pack, an extension of the pin from the boss is measured. The measurement is then stamped on the outside of the housing for future reference and the boss is plugged. To measure wear at any time thereafter; the plug is removed, the brakes are actuated, and the pin is reinserted. The extension distance is re-measured and compared with the original measurement. If the difference between measurements is within a specified wear limit, the disc pack need not be replaced. If the difference exceeds the specified wear limit, new plates are required.

Although the method disclosed in the '882 patent may be acceptable for some applications, it may also be limited. In particular, the method may not provide an indication of failure that is premature to fully worn conditions. Further, the method may be time intensive and complicated, providing opportunity for error.

The brake assembly of the present disclosure is directed toward solving one or more of the problems set forth above and/or other problems of the prior art.

SUMMARY

One aspect of the present disclosure is directed to a brake assembly. The brake system may include a brake housing, an output member rotatably disposed within the brake housing, and a disc stack disposed within a cavity of the brake housing. The disc stack may have a plurality of friction discs operatively coupled to the output member and a plurality of separator plates interleaved with the plurality of friction discs and operatively coupled to the brake housing. The brake assembly may also include a piston disposed within the cavity and configured to compress the disc stack, and an indicator slidingly received within a bore of the brake housing against the piston. The indicator may have a first feature configured to provide at least one of visual and tactile indication of wear of the disc stack, and a second feature configured to provide at least one of a visual and tactile indication of failure of the disc stack.

Another aspect of the present disclosure is directed to a wear and failure indicator for a brake assembly. The wear and failure indicator may include an elongated pin member having a first end configured to engage a piston of the brake assembly, and an opposing second end. The wear and failure indicator may also include a wear feature located at the second end and configured to provide at least one of a visual and tactile feedback regarding a wear condition of a disc pack of the brake assembly, and a failure feature located between the first and second ends, the failure feature configured to provide at least one of a visual and tactile feedback regarding a failure condition of the disc pack.

Another aspect of the present disclosure is directed to a brake housing for a brake system. The brake housing may include a generally cylindrical housing member having an axial inboard end and an axial outboard end. The housing member may form a generally hollow enclosure configured to receive a disc stack and a piston of the brake assembly. The brake housing may also include an opening formed in the inboard end of the housing member and configured to receive a shaft passing through the disc stack, and an indicator bore formed in the inboard end radially outward of the opening at an assembled twelve o'clock position. The indicator bore may be configured to receive a pin that engages an end of the piston.

BRIEF DESCRIPTION OF THE DRAWINGS

FIG. 3 is a cross-sectional illustration of an exemplary disclosed brake housing associated with the brake assembly of FIG. 2;

FIG. 4 is end-view diagrammatic illustration of the brake housing of FIG. 3.

DETAILED DESCRIPTION

Figure 1:
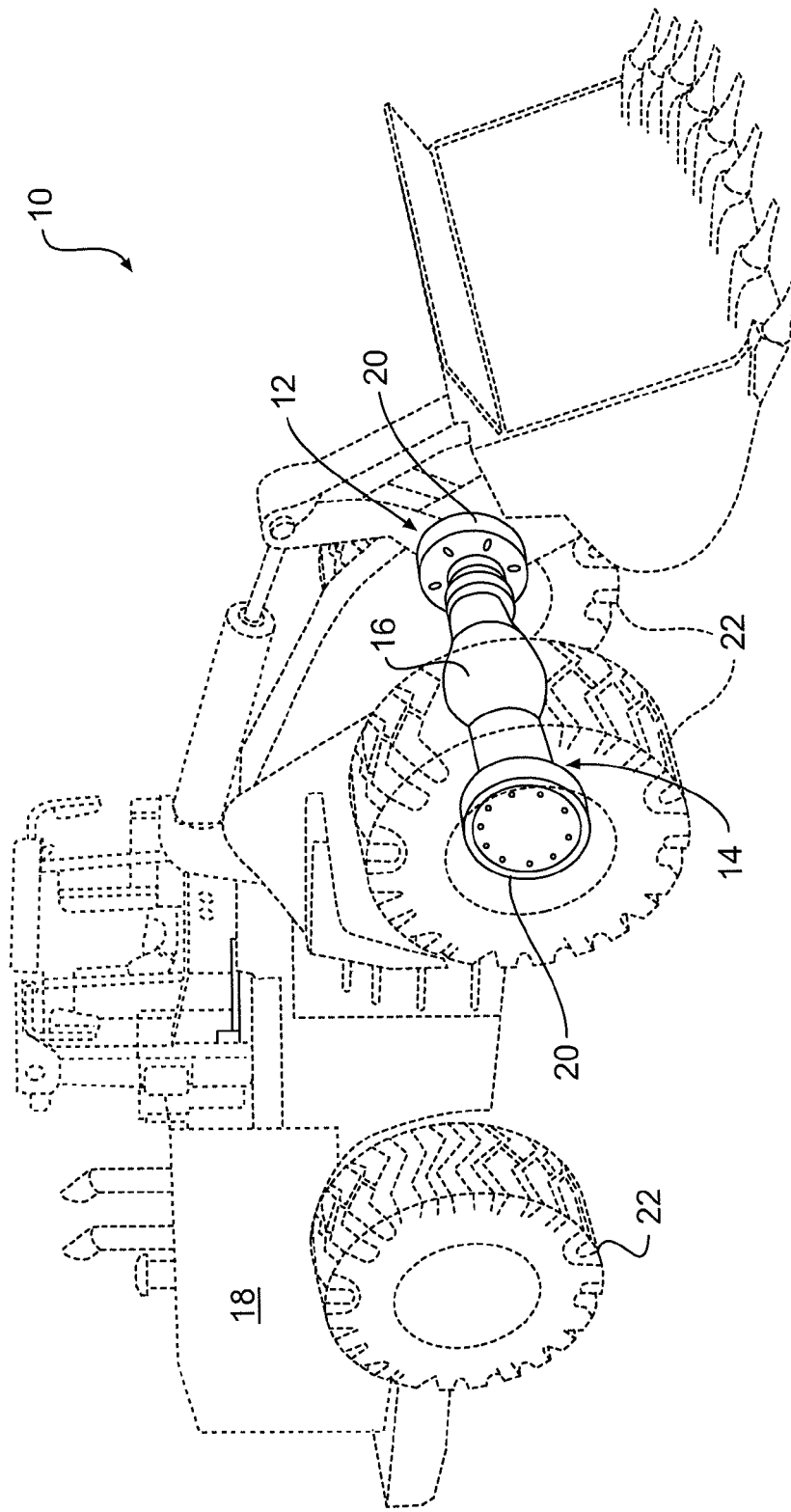
FIG. 1 is a pictorial illustration of an exemplary disclosed machine.

FIG. 1 illustrates an exemplary mobile machine 10 having left and right wheel groups 12, 14 coupled to each other by way of a differential 16. An input member, such as a driveshaft (not shown), may drivingly connect an engine 18 of machine 10 to differential 16, and an output member 20, such as a wheel, may drivingly connect wheel groups 12, 14 to traction devices 22 located at opposing sides of machine 10. In one embodiment, traction devices 22 may be tires, although other types of traction devices 22 may alternatively be utilized. Wheel groups 12, 14, may be drivingly coupled to differential 16 such that a rotation of the input member results in a corresponding rotation of traction devices 22.

Figure 2:
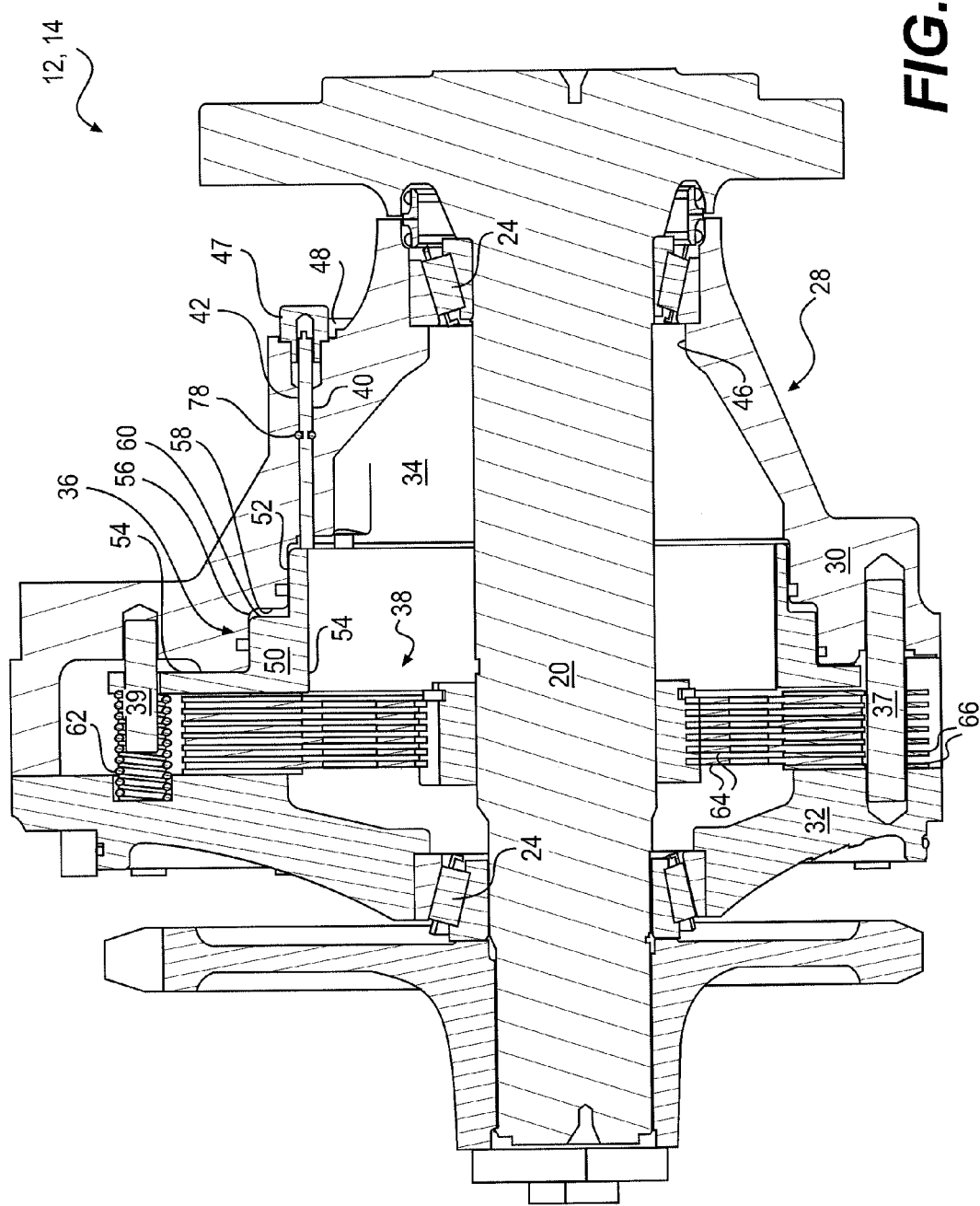
FIG. 2 is a cross-sectional illustration of an exemplary disclosed brake assembly that can be utilized in conjunction with the machine of FIG. 1.

Wheel groups 12, 14, as illustrated in FIG. 2, may each include one or more bearings 24 that are spaced apart along an outside of output member 20. Output member 20 may be driven by differential 16 and, in some arrangements, speed-reduced by a gear arrangement (not shown). It should be noted that left wheel group 12 may be substantially identical to right wheel group 14. It should also be noted that FIG. 2 is not a complete cross-section (i.e., not a cross section taken along a single plane), but instead includes two intersecting cross-sections taken along different planes. For this reason, the illustration of FIG. 2 may seem asymmetrical and this may or may not be the case.

Left and right wheel groups 12, 14 may each be equipped with a brake assembly 28 configured to selectively resist rotation of output member 20 when actuated. Brake assembly 28 may include, among other things, a stationary main brake housing 30 that, together with an end cover 32, at least partially forms an enclosed annular recess or cavity 34. Recess 34 may be configured to receive an actuator 36 and a disc stack 38, while also holding a supply of coolant that absorbs heat from disc stack 38. Cover 32, in this embodiment, may function as a reaction plate at an end of disc stack 38 opposite actuator 36. It is contemplated, however, that a separate reaction plate may alternatively be included within brake assembly 28, if desired. Main brake housing 30 and end cover 32 may each support one of bearings 24 at opposing axial ends of brake assembly 28.

Main brake housing 30 may be a cylindrical and generally hollow structure that is fixedly connected to cover 32 and/or to a frame of machine 10 by way of one or more threaded fasteners (not shown) that axially and/or rotationally constrain main brake housing 30. In the exemplary embodiment shown in FIGS. 3 and 4, main brake housing 30 may be formed through a casting process to include an indicator bore 40 configured to receive a wear and failure indicator ("indicator") 42 (shown only in FIGS. 2 and 5), and an adjustment port 44 (shown only in FIG. 4) generally parallel with indicator bore 40 and configured to receive a movement limiter (not shown) associated with actuator 36.

Indicator bore 40 and adjustment port 44 may be are annularly arranged around a center opening 46. In particular, indicator bore 40 may be generally located at a twelve o'clock position (relative to the pull of gravity) when main brake housing 30 is assembled to machine 10 and machine 10 is parked on level ground. Adjustment port 44 may be generally located at a one o'clock position (when viewed from an outboard end) or a eleven o'clock position (when viewed from an inboard end). Center opening 46 of main brake housing 30 may be configured to receive bearing 24 and output member 20. Each of inlet bore 40 and adjustment port 44 may be machined (e.g., drilled and tapped) within corresponding cast bosses of main brake housing 30, and include a relatively smooth, flat end face that is substantially perpendicular to the associated hole. Threads formed within the cast bosses may engage corresponding threads in an indicator cap 47 and a port plug 48. Indicator cap 47 may close off indicator bore 40 and enclose an end of indicator 42. Port plug 48 may close off an end of adjustment port 44.

Actuator 36 may embody a service piston 50 that works to slow, stop, and/or hold machine 10 still under different conditions. Service piston 50 may be ring-like and have a generally L-shaped cross section defining an outer annular surface 52 (at the back of the L-shape), an outer end surface 54 (at the tip end of the L-shape), and at least one shoulder 56 located between outer annular and end surfaces 52, 54. Outer annular and end surface 52,54, together with a stepped inner annular surface 58 of main brake housing 30, may form a control chamber 60. When control chamber 60 is filled with pressurized oil, service piston 50 may be urged toward cover 32, thereby compressing disc stack 38.

A plurality of springs 62 may be arranged in various configurations and disposed on dowel pins 39 located between main cover 32 and service piston 50 to bias service piston 50 away from disc stack 38. In these configurations, when pressurized fluid is not supplied into control chamber 60, service piston 50 may be deactivated by springs 62. One or more additional dowel pins 37 (e.g., dowel pins having a longer length than dowel pins 39) may function to rotationally constrain components of disc stack 38 to main brake housing 30 and/or main cover 32.

Disc stack 38 may include a plurality of friction discs 64, a plurality of separator plates 66 interleaved with friction discs 64 and, in some instances, a damper (not shown) located at one or both ends of disc stack 38. Friction discs 64 may be connected to rotate with output member 20, while separator plates 66 may be connected to stationary main brake housing 30 by means of dowel pins 37. In this manner, when actuator 36 is activated, friction discs 64 may be sandwiched between actuator 36, separator plates 66, and cover 32, thereby creating frictional torque that resists rotation of output member 20. A pressure of fluid within actuator 36 (i.e., within control chamber 60) may relate to a magnitude of the frictional torque resisting rotation of output member 20.

Figure 5:
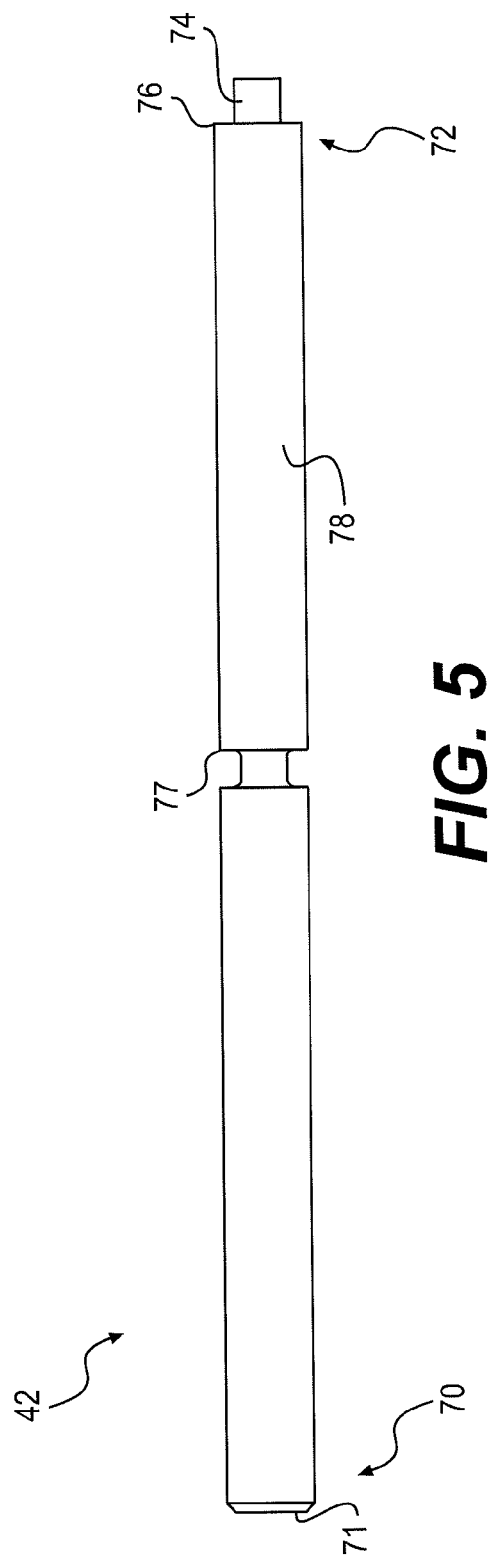
FIG. 5 is side-view diagrammatic illustration of an exemplary disclosed wear and failure indicator that may be used in conjunction with the brake assembly of FIG. 2.

Indicator 42 may be an elongated, generally cylindrical member that is configured to pass through indicator bore 40 and the corresponding step in main brake housing 30 to engage the end surface (i.e., the lip) of service piston 50. As shown in FIG. 5, indicator 42 may be a pin having a first or internal end 70 and a second or external end 72. First end 70 may be situated internally within brake assembly 28 (e.g., against service piston 50), while second end 72 may extend out of indicator bore 40 such that it may be visible and/or accessible by an operator of machine 10 when indicator cap 47 is removed. First end 70 may include a chamfer 71 that facilitates insertion within indicator bore 40. Second end 72 may include a first feature 74 associated with a wear condition of disc stack 38, and a second feature 76 associated with a failure condition of disc stack 38. As will be described in more detail below, the operator of machine 10, based on visual and/or tactile feedback from first and second features 74, 76, may be able to determine the existence and/or state of the wear and failure conditions.

First feature 74 may be a tip end having a reduced diameter and extending from a base portion 78 a desired distance. In the disclosed embodiment, first feature 74 has a cylindrical cross-section, although other shapes may alternatively be utilized. The distance that first feature 74 extends from base portion 78 (i.e., the length of first feature 74) may be selected to correspond with an amount of travel of service piston 50 from a fully actuated state corresponding to an unworn or new disc stack 38, to a fully actuated position corresponding to a fully worn or used disc stack 38 that should be replaced. In the exemplary embodiment shown in FIG. 5, first feature 74 may have a length of about 2.75-3.15 mm and an outer diameter of about 3.0-3.2 mm. In this same embodiment, the overall length of indicator 42 may be about 98.8-98.9 mm, while the outer diameter of base portion 78 may be about 5.85-5.90 mm.

Second feature 76 may be a generally perpendicular shoulder located at a transition point between first feature 74 and base 78. Second feature 76 may be located to correspond with an axial thickness of disc pack 38 and/or actuated position of service piston 50 that is found only in a new brake assembly 28.

Indicator 42 may have a relatively close fit with indicator bore 40, such that little (if any) coolant from within brake assembly 28 is allowed to escape cavity 34. In the disclosed embodiment, the inner diameter of indicator bore 40 may be about 5.95 mm. In addition, indicator 42 may include a recess 77 located about midway along its length, and a seal 80 (e.g., an o-ring seal shown only in FIG. 2) disposed within recess 77. Seal 80 may be configured to engage an outer annular surface of recess 77 and an inner annular surface of indicator bore 40 so as to completely block any flow of coolant therebetween.

INDUSTRIAL APPLICABILITY

The disclosed indicator may be applicable to any brake assembly where knowledge about both wear and failure of an associated disc stack is beneficial. The disclosed wear indicator may provide visual and/or tactile feedback regarding the existence and/or state of a wear condition and a failure condition. Use of wear and failure indicator 42 will now be described.

The state of brake assembly 28 (i.e., of disc stack 38) may be checked by first actuating brake assembly 28. In particular, an operator of machine 10 may depress a brake pedal to cause full engagement of brake assembly 28. In response to this manipulation of the brake pedal, high-pressure fluid may be directed into control chamber 60 causing service piston 50 to compress disc stack 38. While the operator of machine 10 maintains the depression of the brake pedal, a service technician may remove cap 47 and press against second end 72 of indicator 42 to move first end 70 into engagement with the lip of service piston 50.

At this time, as long as the end face of first feature 74 is not flush with or not retracted into end face of the boss at indicator bore 40, disc stack 38 may not yet be completely worn. This observation may be made visually and/or physically (e.g., by feeling the end of indicator 42 with a digit). When first feature 74 extends outward from indicator bore 40, but second feature 76 cannot be seen or felt by the technician, disc stack 38 may be operational and have additional wear capacity. However, when second feature 76 is exposed (i.e., when second feature 76 extends outward from the end face of the boss at indicator bore 40), disc stack 38 may have failed. That is, disc stack 38 may have overheated and warped, thereby increasing a thickness of disc stack 38 and pushing service piston 50 to a point that causes indicator 42 to extend from indicator bore 40 until second feature 76 can be visually and/or physically observed. After checking the condition and status of brake assembly 28, cap 47 may be replaced.

The disclosed indicator may have multiple benefits. Specifically, the disclosed indicator may be simple, easy to use, and have few opportunities for error in the use thereof. In addition, the disclosed indicator may not require adjustment at initial assembly and/or during operation. Further, the disclosed indicator may provide feedback regarding both disc stack wear and disc stack failure.

It will be apparent to those skilled in the art that various modifications and variations can be made to the brake assembly and indicator of the present disclosure without departing from the scope of the disclosure. Other embodiments will be apparent to those skilled in the art from consideration of the specification and practice of the brake assembly and indicator disclosed herein. It is intended that the specification and examples be considered as exemplary only, with a true scope of the disclosure being indicated by the following claims and their equivalents.

What is claimed is:

1. A brake assembly, comprising:
    a brake housing;
    an output member rotatably disposed within the brake housing;
    a disc stack disposed within a cavity of the brake housing, the disc stack having a plurality of friction discs operatively coupled to the output member and a plurality of separator plates interleaved with the plurality of friction discs and being operatively coupled to the brake housing;
    a piston disposed within the cavity and configured to compress the disc stack; and
    an indicator slidingly received within a bore of the brake housing against the piston, the indicator having a first feature configured to provide at least one of visual and tactile indication of wear of the disc stack, and a second feature configured to provide at least one of a visual and tactile indication of failure of the disc stack, wherein the first feature is and the second feature is a shoulder located at a base of the tip.

2. The brake assembly of claim 1, wherein the tip of the first feature is a cylindrical tip that protrudes past an end face of the bore during a brake check procedure when additional use of the disc stack is acceptable and is flush with or is recessed within the bore during the brake check procedure when the disc stack should be replaced.

3. The brake assembly of claim 2, wherein the shoulder of the second feature protrudes from the bore during the brake check procedure only when a failure of the disc stack has occurred.

4. The brake assembly of claim 3, wherein the indicator includes:
    an annular recess located about midway along a length direction; and
    a seal fitted within the annular recess and configured to engage annular walls of the bore.

5. The brake assembly of claim 3, wherein the indicator has:
    an internal end opposite the first feature; and
    a chamfer formed at the internal end.

6. The brake assembly of claim 3, wherein:
    an outer diameter of the indicator is about 5.85-5.90 mm; and
    an internal diameter of the bore is about 5.95 mm.

7. The brake assembly of claim 6, wherein an outer diameter of the cylindrical tip is about 3.0-3.25 mm.

8. The brake assembly of claim 3, wherein:
    an overall length of the indicator is about 98.8-98.9 mm; and
    a length of cylindrical tip is about 2.75-3.15 mm.

9. The brake assembly of claim 1, further including a cap configured to engage the brake housing and enclose an end of the indicator.

10. The brake assembly of claim 9, wherein the bore is tapped to receive threads of the cap.

11. The brake assembly of claim 1, wherein the bore is positioned to align the indicator with an annular lip of the piston.

12. The brake assembly of claim 11, further including a plurality of springs located at a side of the piston opposite the indicator, the plurality of springs configured to bias the piston away from the disc stack and toward the indicator.

13. The brake assembly of claim 1, further including an end cover configured to close off the cavity of the brake housing, the end cover and brake housing together configured to hold a volume of coolant.

14. The brake assembly of claim 13, wherein:
the brake housing further includes an adjustment port oriented generally parallel with the bore and configured to receive a movement limiter associated with the piston;
the bore is located at about a twelve o'clock position relative to the pull of gravity when assembled to a mobile machine on level ground; and
the adjustment port is located at about a one o'clock or eleven o'clock position.

15. A wear and failure indicator for a brake assembly, comprising:
an elongated pin member having a first end configured to engage a piston of the brake assembly, and an opposing second end;
a wear feature located at the second end and configured to provide at least one of a visual and tactile feedback regarding a wear condition of a disc stack of the brake assembly, wherein the wear feature includes a tip; and
a failure feature located between the first and second ends, the failure feature configured to provide at least one of a visual and tactile feedback regarding a failure condition of the disc pack, wherein the failure feature includes a shoulder located at a base of the tip.

16. The wear and failure indicator of claim 15, wherein:
the elongated pin member includes an internal end; and
the tip of the wear feature is a cylindrical tip located at an end opposite the internal end.

17. The wear and failure indicator of claim 16, wherein the wear and failure indicator includes:
an annular recess located about midway along a length direction; and
an o-ring seal fitted within the annular recess.

18. The wear and failure indicator of claim 16, further including a chamfer formed at the internal end.

19. The wear and failure indicator of claim 16, wherein:
an outer diameter of the wear and failure indicator is about 5.85-5.90 mm; and
an outer diameter of the cylindrical tip is about 3.0-3.25 mm.

20. The wear and failure indicator of claim 19, wherein:
an overall length of the wear and failure indicator is about 98.8-98.9 mm; and
a length of cylindrical tip is about 2.75-3.15 mm.

21. A brake housing for a brake assembly, comprising:
a cylindrical housing member having an axial inboard end and an axial outboard end, the cylindrical housing member forming a generally hollow enclosure configured to receive a disc stack and a piston of the brake assembly;
an opening formed in the inboard end of the cylindrical housing member and configured to receive a shaft passing through the disc stack;
an indicator bore formed in the inboard end radially outward of the opening at an assembled twelve o'clock position, the indicator bore configured to receive a pin that engages an end of the piston, and
an adjustment port generally parallel with the indicator bore.

22. The brake housing of claim 21, wherein:
the generally hollow enclosure includes first and second steps configured to receive a shoulder and an annular lip of a piston; and
the indicator bore passes through the second step.

23. The brake housing of claim 21, wherein the adjustment port is formed at an assembled one o'clock or eleven o'clock position, and passes through the second step.

24. The brake housing of claim 21, further including a threaded boss formed at the indicator bore in the axial inboard end.

* * * * *